(12) United States Patent
Godbillon

(10) Patent No.: US 6,170,971 B1
(45) Date of Patent: Jan. 9, 2001

(54) INDICATING LIGHT DISPLAY HAVING SEVERAL LIGHT SOURCES

(75) Inventor: Vincent Godbillon, Paris (FR)

(73) Assignee: Valeo Vision, Bobigny (FR)

( * ) Notice: Under 35 U.S.C. 154(b), the term of this patent shall be extended for 0 days.

(21) Appl. No.: 09/295,960

(22) Filed: Apr. 21, 1999

(51) Int. Cl.$^7$ ................................ B60Q 1/26; F21V 5/02
(52) U.S. Cl. .................... 362/543; 362/240; 362/244; 362/331
(58) Field of Search .................... 362/240, 244, 362/245, 246, 331, 543, 544, 545; 313/500

(56) References Cited

U.S. PATENT DOCUMENTS

| | | | |
|---|---|---|---|
| 4,862,330 | * 8/1989 | Machida et al. | 362/244 |
| 5,093,768 | 3/1992 | Ohe | 362/241 |
| 5,580,156 | * 12/1996 | Suzuki et al. | 362/240 |

FOREIGN PATENT DOCUMENTS

| | | |
|---|---|---|
| 39 16875 | 12/1990 | (DE) . |
| 0 648 969 | 4/1995 | (EP) . |
| 0 762 049 | 3/1997 | (EP) . |
| 2 707 222 | 1/1995 | (FR) . |

OTHER PUBLICATIONS

French Search Report dated Dec. 23, 1998.

* cited by examiner

*Primary Examiner*—Alan Cariaso
(74) *Attorney, Agent, or Firm*—Morgan & Finnegan, LLP

(57) ABSTRACT

An indicating light display for a motor vehicle, and in particular a raised stop light in the form of a strip which contains a plurality of light sources, also includes optical processing means for redirecting the light received from the light sources so that it will be propagated in the general emission direction. The display thus consists of a series of light cells, each defining a transition zone between each cell and the next. The optical processing means include, in association with each light source, a first element for distributing the light, in a plane at right angles to the general emission direction, on a second element in the form of an optical plate. This optical plate is divided into zones each associated with one of the cells and formed with projecting striations. Each transition between a zone and the next zone is formed with a transition striation which receive light from both of the two adjacent light sources and redirects this towards the general emission direction.

17 Claims, 2 Drawing Sheets

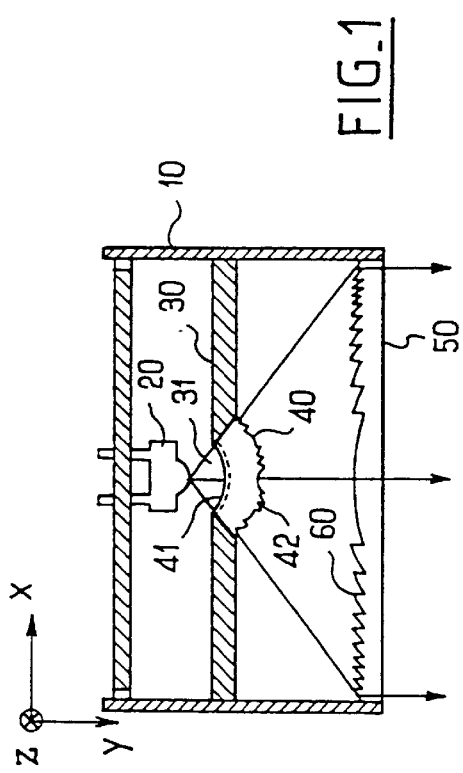
FIG_1
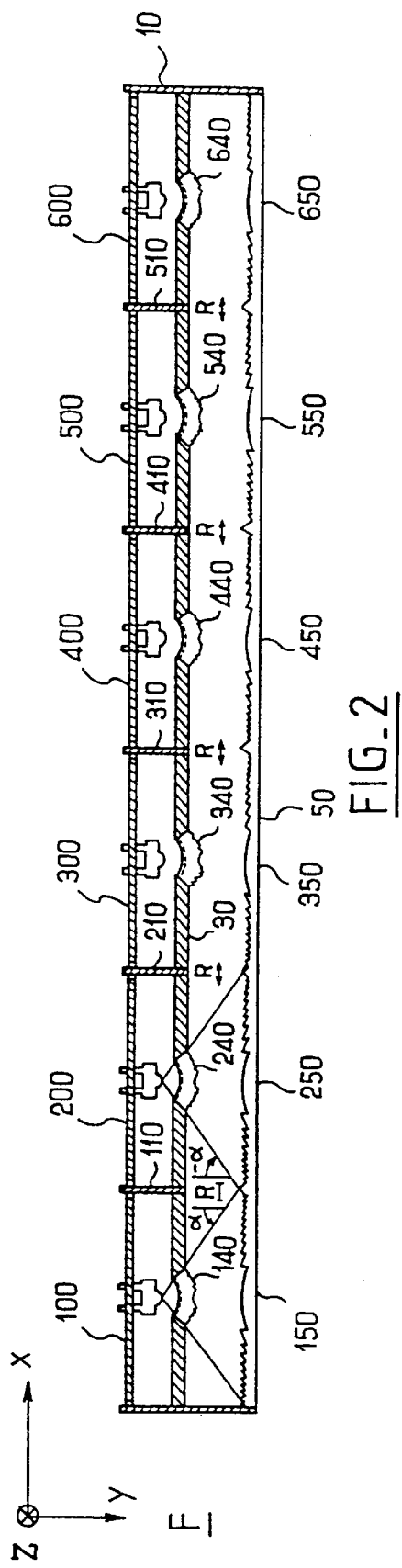
FIG_2

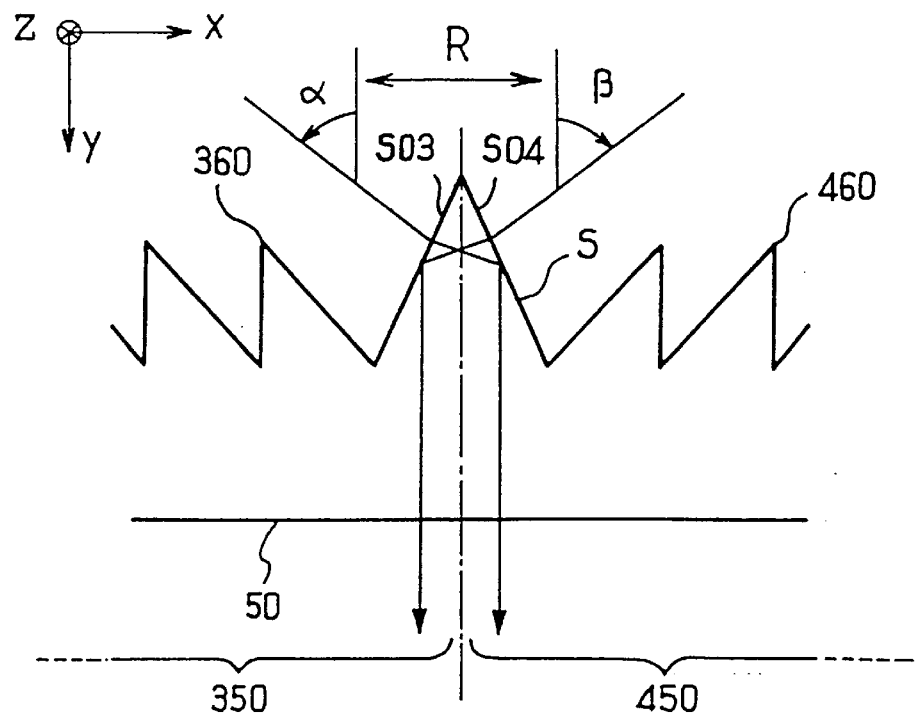
FIG_3
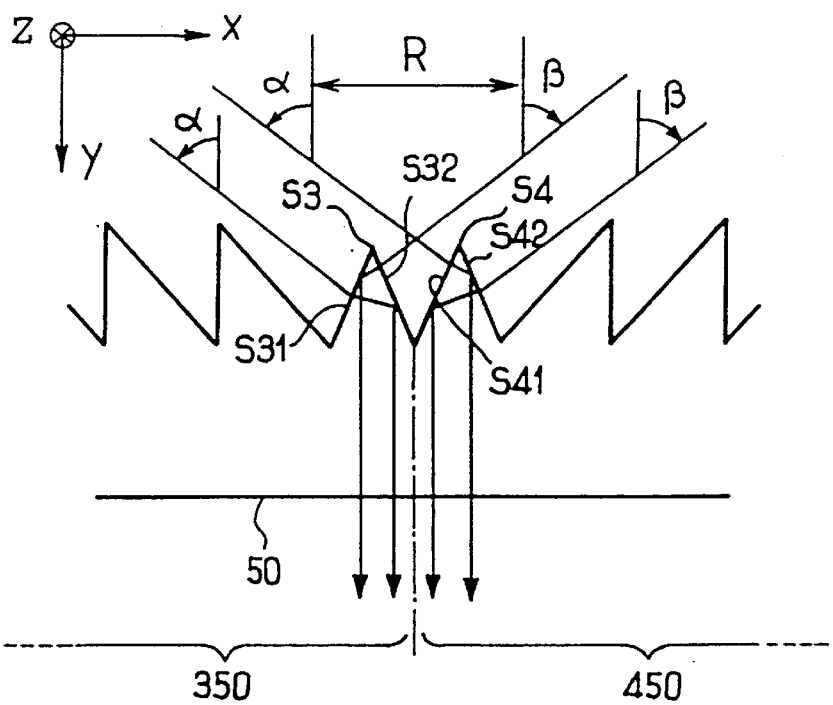
FIG_4

INDICATING LIGHT DISPLAY HAVING SEVERAL LIGHT SOURCES

FIELD OF THE INVENTION

The present invention relates to indicating light displays for motor vehicles, applicable especially to light displays of the stop lamp type, that is to say brake lights which can be mounted inside the cabin of the vehicle and against the rear window of the vehicle, or else be integrated into thin components which are situated at the rear of the vehicle, such as fins or other aerodynamic elements.

BACKGROUND OF THE INVENTION

The first indicating light displays of the above type had the disadvantage that they did not provide a homogeneous light, despite various spreading arrangements for spreading the light which were used and which consisted generally of billets or toroids incorporated in the cover lens of the display, or in an optical plate of the display. Although this disadvantage is in general tolerable from the point of view of the statutory regulations, it is ugly from the aesthetic point of view, especially since, nowadays, increasing importance is being attached to the homogeneity of the light emitted by indicating lights of vehicles.

French patent specification No. 2 614 969 discloses an indicating light display with a single light source, giving homogeneous illumination. That particular display comprises, within a housing, a transparent or translucent optical screen which is referred to as a "supplementary lens", and which is interposed between a single light source and an optical plate. This plate is essentially flat and extends in the direction at right angles to the optical axis of the light display. The particular geometrical configuration of the supplementary lens ensures that the surface density of light flux arriving on the optical plate is essentially constant over the whole surface of this plate. Finally, the surface of the plate is formed with striations which redistribute, or redirect, the light rays emitted from the supplementary lens, so as to transmit to the outside of the vehicle a beam within the solid angle provided for in the regulations.

However, vehicle manufacturers have in practice designed stop lights with dimensions which are sometimes very large, and which make use of a plurality of light sources. It is clearly possible to conceive the use of a device that consists of optical sub-assemblies of the kind described in the above mentioned French patent specification, juxtaposed together and giving homogeneous illumination within each sub-assembly. However, in such an arrangement there would then be irregularities in the illumination at the junctions, or transition zones, between adjacent sub-assemblies.

DISCUSSION OF THE INVENTION

An object of the present invention is to overcome the above mentioned drawback, and to provide an indicating light display which may be made in a large size and which uses a plurality of light sources, while at the same time presenting a homogeneous illumination to the observer, which is of particular advantage from the aesthetic point of view.

Another object of the invention is to enable the number of light sources in such an indicating light display to be limited, for a given size, without in any way compromising the homogeneity of the light field of the display when the latter is lit.

According to the invention in a first aspect, an indicating light display for a motor vehicle, comprising a plurality of light sources together with optical processing means which are adapted to redirect the light emitted by the light sources so that the light is propagated in a direction which is essentially parallel to a general emission direction, is characterised in that the optical processing means include, in association with each light source, a first element adapted to spread the light, in a plane which is essentially at right angles to the general direction of emission and in an essentially homogeneous manner, on a corresponding one of a plurality of second elements having the general form of a plate and adapted to redirect the incident light towards the said general emission direction, and in that there is provided at the transition between two adjacent ones of the said second elements at least one transition striation projecting towards the interior of the indicating light display and adapted to redirect into the said general emission direction the light emitted from the two homologous light sources associated with the said second elements.

Preferably there is only one said transition striation at the or each said transition.

According to a preferred feature of the invention, each said second element has redirecting striations on the surface of that element which faces towards the interior of the light display, and each said transition striation projects further towards the interior of the said display than the said redirecting striations of the said second elements.

Preferably, each said transition striation has two oblique faces.

The light sources are preferably essentially aligned with each other.

According to another preferred feature of the invention the or each said transition striation comprises two oblique faces which are opposed in relation to a plane containing the said general emission direction.

According to the invention in a second aspect, an optical plate including optical processing means which are adapted to redirect in a general emission direction the light emitted from a light source and arriving on the plate with a given first angle of incidence which is substantially constant, is characterised in that at least one portion of the said optical processing means is also exposed to the light from a second light source arriving with a substantially constant second angle of incidence, and is adapted to redirect the light from the two light sources towards the said general emission direction.

In this second aspect of the invention, the said portion of the optical processing means preferably comprises at least one projecting striation having two faces; and preferably also, there is a single said projecting striation in the or each said portion of the plate.

According to a preferred feature of this said second aspect of the invention, redirection striations, projecting from the surface of the said plate are provided, and in that the said at least one projecting striation at the said transitions projects by a greater extent away from the optical plate than do the redirection striations.

In some embodiments of this second aspect, there are, in each said portion of the plate, a plurality of the said projecting striations.

The value of the said second angle of incidence is preferably equal and opposite to the value of the said first angle of incidence.

Preferably, the or each said projecting striation has two oblique faces which are opposed with respect to a plane at right angles to a line joining the two associated light sources.

Further features and advantages of the invention will appear more clearly on a reading of the following detailed description of some preferred embodiments of the invention, which is given by way of non-limiting example only and with reference to the accompanying drawings.

BRIEF DESCRIPTION OF THE DRAWINGS

FIG. 1 is a diagrammatic plan view showing in cross section an optical cell which contains the elements of an indicating light display of a known type, including a single light source together with a striated optical processing means in the form of a plate-like front lens which gives homogeneity to the light emitted by the display.

FIG. 2 is a diagrammatic plan view showing a display according to the invention in cross section, the display consisting of a combination of cells similar to that shown in FIG. 1, with specific means for optical processing purposes at the transition between two adjacent cells.

FIG. 3 is a view taken from FIG. 2 and detailing a device for treating the light produced at the transition between two adjacent cells.

FIG. 4 shows another embodiment of an optical processing means at the junction of two adjacent cells.

DESCRIPTION OF PREFERRED EMBODIMENTS OF THE INVENTION

Before we proceed with the description, three orthogonal directions X, Y and Z will be defined. These directions will be used in the drawings and in the following description. Y is the direction of the optical axes of the elements of the indicating light displays shown in the drawings. X and Z are the horizontal and vertical directions, respectively, in the display as mounted in a vehicle.

Reference is first made to FIG. 1, which shows an optical cell comprising a housing 10, having a base on which a light source is mounted. This light source may for example be a so-called Brewster diode 20. An opaque wall 30 extends across the housing 10 within the latter, and has a central circular aperture 31. The aperture 31 is filled by a hemispherical lens 40 for spreading the light rays issued from the diode 20. This lens 40 is preferably made integral with the opaque wall 30, and has an inner face 41 which is striated, and an outer face 42 which is also striated. The cell includes a second plate 50 which is transparent and which has striations 60 on its inner face. Such an optical cell, from which an indicating light display can be formed by adding a cover lens to it, or by using the plate 50 to close off the display, so that the plate 50 then acts as a cover lens (and is in that case provided with means for diffusing the light), is of a generally known type. Accordingly, no further details of its operation need be described here, this being such as to ensure that the illumination that emerges through the plate 50 is homogeneous in the X and Z directions, due to the striations 60 on its inner face and the striations on the outer face 42 of the supplementary lens 40, respectively (or inversely). In this connection, reference is invited to the above mentioned French patent specification No. 2 614 969.

Reference is now made to FIG. 2, which shows an embodiment of an indicating light display (F) in which a single housing 10 contains six optical cells 100 to 600, each of which is similar to the cell shown in FIG. 1. In the embodiment shown in FIG. 2, opaque walls 110, 210, 310, 410 and 510 extend in the Y direction between the base of the housing 10 and a first plate 30 which includes six supplementary lenses 140, 240, 340, 440, 540, 640. The second plate 50 of the light display has six redirection, or redistribution, zones 150, 250, 350, 450, 550, 650 which are all made integral with each other in this particular embodiment, but which could equally well be made as separate components and secured together.

In order to ensure homogeneous transition of the illumination between two adjacent zones 150, 250 etc., a transition zone R is provided. This transition zone R receives the light rays emitted by each of the two supplementary lenses 140 etc. of the two adjacent cells concerned. Within each transition zone R, optical treatment means are provided, for acting on the light rays emitted from the two associated supplementary lenses. The operation of these optical processing means will now be described in more detail, in particular with reference to FIG. 3.

Referring accordingly to FIG. 3, this is a detail view of the transition zone between two adjacent redirection zones 350 and 450 of the indicating light display shown in FIG. 2. It will of course be understood that FIG. 3 and the associated description apply equally well to the transitions between all the various redirection zones 150 etc. and their adjacent zones 250 etc. in the light display shown in FIG. 2.

In FIG. 3, the transition zone R is exposed simultaneously to the light rays emitted from the supplementary lens 340 and those emitted from the supplementary lens 440. The rays from the lens 340 arrive with individual angles of incidence the values of which are closely approximate to a first mean angle of incidence α. It should be noted that the angle of incidence is defined with respect to the Y direction and measured positively in the trigonometric sense. The rays from the lens 440 arrive with individual angles of incidence which are substantially equal and which are closely approximate to a second mean angle of incidence β.

In the present embodiment, the angles α and β have opposite signs, because the cells of the apparatus in this embodiment are identical to each other. However, the angles α and β could if desired have any values whatever, between 0 and 90°.

The zone 350 carries on its inner face, in the transition zone between the cells 300 and 400, vertical striations 360 which are adapted to redirect, by internal reflection, the light rays emitted from the supplementary lens 340, in such a way as to give these rays a direction which is essentially parallel to the Y direction. Similarly, the zone 450 carries on its inner face vertical striations 460 for redirecting, again by internal reflection, the light rays from the supplementary lens 440, so that these rays too are given a direction which is essentially parallel to the Y direction. In the transition zone of the internal faces of the zones 350 and 450 there is a single transition striation S, which is in the form of a projecting tooth as shown in FIG. 3, projecting towards the interior of the indicating light display and having two faces SO3 and SO4. These two faces are symmetrical with the Y direction in this embodiment, since the values of α and β are equal and opposite to each other. The superficial light flux density received by the zones 350 and 450 is substantially constant, due to the fact that the optical cells are identical with each other, so that the illumination emitted from the zones 350 and 450 is constant outside the transition zone R.

The function of the transition striation S is to ensure that the rays arriving in the transition zone R are also diverted in the Y direction. To this end, the striation S projects in the Y direction sufficiently far towards the interior of the indicating light display for its face SO3 to intersect essentially the rays emitted from the supplementary lens 340 and directed towards the zone 450. These rays, all of which reach the face SO3 with an angle of incidence which is substantially equal to α, pass through the zone R by refraction across the face SO3, and then by internal reflection on the face SO4. The inclination of the faces SO3 and SO4 is such that the rays then leave the plate 50 in a direction which is essentially parallel to the Y direction. Similarly, the face SO4 essentially intercepts the rays emitted by the supplementary lens 440 and directed towards the zone 350, and these rays, which arrive at the face SO4 with an angle of incidence which is substantially equal to β, are diverted in the Y direction by refraction through the face SO4 followed by internal reflection on the face SO3.

The indicating light display shown in FIGS. 2 and 3 accordingly delivers illumination which is generally constant in the X direction. As to distribution of the illumination in the Z direction, this is ensured by the internal striations 41 of the supplementary lenses, which are identical with each other.

Reference is now made to FIG. 4, which shows another version of the striation S, in the form of a first transition striation S3 having two faces S31 and S32, together with a second transition striation S4 which has two faces S41 and S42. In this version, the faces S31 and S41 receive the rays which have been emitted by the supplementary lens 340, while the faces S32 and S42 receive rays emitted from the supplementary lens 440. This embodiment enables the same function as that of the single striation S in FIG. 3 to be obtained again, but with the striations S3 and S4 intercepting and redirecting in the Y direction, essentially, those rays which have been emitted from one cell and directed towards the cover lens of the adjacent cell. This avoids any increase in the maximum thickness of the plate 50.

If the width of the transition zone has to be large, or if it is desired to reduce the thickness of the front plate 50, it is possible to provide a device which has the same function as the striation S, but using a plurality of striations, having two oblique faces which are essentially symmetrical and which are aligned on the internal face of the front plate 50.

It is appropriate to add to the description just given that, in practice, an indicating light display made in accordance with the invention could equally enclose a cover glass having billets or toroids for spreading the light emitted from the second or front plate 50 within the solid angle prescribed by regulations.

In addition, the use of the supplementary lenses 40 and front plates 50 enables the angles α and β, which define the extent of the zones of the plates 50 associated with each light source, to be increased. It is thus possible, in an indicating light display according to the invention, to increase the length of the display as compared with a conventional indicating light display, while retaining the same number of light sources. It is also possible to reduce the number of light sources for a given length of indicating light display, which improves the selling price of the unit.

Thus, an indicating light display made in accordance with the invention can be substantially elongated, making use of a plurality of aligned light sources, thereby conforming with the general current trend in the form of raised stop lights, while improving the aesthetic appearance of the illumination given by this light by providing an illumination which is perfectly homogeneous, and without in any way allowing the internal construction of the display to appear from outside.

The invention is of course not limited to the embodiments described above. In particular, a person familiar with this particular technical field will be able to form light displays having any forms and lengths whatever, making use of the cells which may for example be square, triangular or hexagonal.

What is claimed is:

1. An indicating light display for a motor vehicle, defining a general emission direction and comprising:
    a plurality of light sources; and
    a plurality of optical processing means, each said processing means being associated with a respective one of the light sources and disposed generally in front of the associated light source, for redirecting the light emitted from the associated light source in a direction essentially parallel to the general emission direction, wherein each said optical processing means comprises a first element and a second element in front of the first element, the first element being adapted to redirect on the second element the light received from the associated said light source in a plane which is essentially at right angles to the general emission direction, the second element being generally in the form of a plate and being adapted to redirect light incident thereon towards the general emission direction, the display further defining a transition zone between each said second element and an adjacent said second element with each said transition zone defining at least one transition striation projecting towards the interior of the display and adapted to redirect towards the general emission direction, light emitted from both of the light sources associated with the two second elements.

2. A display according to claim 1, having a single said transition striation in each transition zone.

3. A display according to claim 1, wherein redistribution striations project from a surface of the second element towards the interior of the display, the at least one transition striation projecting towards the interior of the display by a greater amount than the redistribution striations.

4. An indicating light display according to claim 1, wherein each transition striation has two oblique faces.

5. A display according to claim 1, wherein the light sources are essentially aligned with each other.

6. A display according to claim 1, wherein each said transition striations has two oblique faces which opposed to each other with respect to a plane containing the general emission direction.

7. An optical plate, for incorporation in apparatus having a first light source for directing light on the plate with a first angle of incidence and a second light source for directing light on the plate with a second angle of incidence, said angles being substantially constant, the plate defining a general emission direction of light from said first light source, the plate including optical processing means for redirecting in said general emission direction light from the first light source, wherein the optical processing means further includes a transition portion adapted to receive and redirect light from both of the light sources into the general emission direction, wherein the transition portion of the processing means includes at least one transition striation having two faces, the at least one transition striation projecting from a surface of the plate towards the light sources.

8. A plate according to claim 7, having only one said transition striation in the transition portion.

9. A plate according to claim 7, wherein redistribution striations project from the surface of the plate towards the light sources, the redistribution striations projecting from the surface by a smaller amount than the amount by which the at least one transition striation projects.

10. A plate according to claim 7, having a plurality of said transition striations in the transition portion.

11. A plate according to claim 7, wherein the values of the first and second angles of incidence are equal and opposite to each other with respect to a line defined perpendicular to the surface of the plate.

12. A plate according to claim 7, defining a plane perpendicular to the surface of the plate, said at least one transition striation having two oblique faces which are opposed with respect to the plane.

13. A method comprising:
   emitting light from a plurality of light sources in a general emission direction to a plurality of optical processing means, each said processing means being associated with a respective one of the light sources and disposed generally in front of the associated light source, each optical processing means comprises a first element and a second element in front of the first element;
   spreading the emitted light from the associated light source by the first element in a plane which is essentially at right angles to the general emission direction;
   redirecting the spread light from one of the light sources by the second element towards the general emission direction;
   defining a transition zone for receiving light from adjacent first elements associated with two optical processing means; and
   redirecting the light in the transition zone towards the general emission direction by at least one transition striation projecting towards the light sources, each transition striation having two faces.

14. A method comprising:
   directing light from a first light source through a first associated first element of a first optical processing means with a first angle of incidence to a second element of the first optical processing means, the first optical processing means being associated with the first light source;
   directing light from a second light source through a second associated first element of a second optical processing means with a second angle of incidence to a second associated second element of the second optical processing means, said angles being substantially constant, the second optical processing means being associated with the first light source, said second light source being adjacent to said first light source;
   receiving light from both first elements in a transition zone;
   redirecting the light in the transition zone towards a general emission direction by at least one transition striation projecting towards the light sources, each transition striation having two faces.

15. An indicating light display, defining a general emission direction, comprising:
   a plurality of light sources;
   a plurality of hemispherical lens, each hemispherical lens being associated with one of the light sources and generally disposed in front of the associated light source for redirecting the light received from the associated light source in a plane which is essentially at right angles to the general emission direction, each hemispherical lens having an inner face and an outer face, the inner face of each hemispherical lens being striated; and
   a plurality of transparent plates, each transparent plate being associated with one of the hemispherical lens and disposed generally in front of the associated hemispherical lens; each transparent plate having an inner face, the inner face of each transparent plate having striations projecting towards the interior of the display for redirecting light incident thereon from the associated hemispherical lens towards the general emission direction,
   the display further defining a transition zone between each said transparent plate and an adjacent transparent plate, with each said transition zone defining at least one transition striation projecting towards the interior of the display and adapted to redirect, towards the general emission direction, light emitted from both of the light sources associated with the two transparent lens, each transition striation having two oblique faces which are opposed to each other with respect to a plane containing the general emission direction.

16. An indicating light display for a motor vehicle comprising:
   a plurality of means for emitting light in a general emission direction;
   a plurality of optical processing means, each said processing means being associated with a respective one of the emitting light means and disposed generally in front of the associated emitting light means, each said processing means including a first redirecting means and a second redirecting means, the first redirecting means redirects the light emitted from the emitting light means in a plane which is essentially at right angles to the general emission direction, the second redirecting means redirects light from one of the emitting light means towards the general emission direction, the display further defining a transition zone between each said second redirecting means and an adjacent second redirecting means, with each said transition zone defining at least one transition means for redirecting the light from the both the emitting light means associated with the two second redirecting means in the general emission direction.

17. An apparatus comprising:
   a plurality of light sources;
   a plurality of hemispherical lens, each hemispherical lens disposed in front of one of the light sources for spreading light from the associated light source;
   a plurality of transparent plates, each transparent plate disposed in front of one of the plurality of hemispherical lens for redirecting the light from the associated hemispherical lens; and
   a transition striation created by adjacent transparent plates for redirecting light emitted from adjacent light sources.

* * * * *

UNITED STATES PATENT AND TRADEMARK OFFICE
CERTIFICATE OF CORRECTION

PATENT NO. : 6,170,971 B1
DATED : January 9, 2001
INVENTOR(S) : Vincent Godbillon It is certified that error appears in the above-identified patent and that said Letters Patent is hereby corrected as shown below:

<u>Title page,</u>
Item [30], insert "Foreign Priority Data" for:
Mar. 31, 1998 [FR] 98-03982

Signed and Sealed this

Twenty-third Day of October, 2001

*Attest:*

NICHOLAS P. GODICI
*Attesting Officer*     *Acting Director of the United States Patent and Trademark Office*